(12) United States Patent
Kim et al.

(10) Patent No.: US 10,694,512 B2
(45) Date of Patent: Jun. 23, 2020

(54) METHOD AND APPARATUS FOR TRANSMITTING AND RECEIVING REFERENCE SIGNAL

(71) Applicant: Samsung Electronics Co., Ltd., Suwon-si, Gyeonggi-do (KR)

(72) Inventors: Youn-Sun Kim, Seongnam-si (KR); Ki-Il Kim, Yongin-si (KR); Ju-Ho Lee, Suwon-si (KR); Hyo-Jin Lee, Suwon-si (KR); Joon-Young Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 5 days.

(21) Appl. No.: 15/830,824

(22) Filed: Dec. 4, 2017

(65) Prior Publication Data

US 2018/0092075 A1   Mar. 29, 2018

Related U.S. Application Data

(63) Continuation of application No. 13/742,757, filed on Jan. 16, 2013, now Pat. No. 9,877,312.

(30) Foreign Application Priority Data

Jan. 16, 2012   (KR) .................. 10-2012-0004666

(51) Int. Cl.
*H04W 72/04* (2009.01)
*H04L 5/00* (2006.01)
(Continued)

(52) U.S. Cl.
CPC ......... *H04W 72/042* (2013.01); *H04L 5/0037* (2013.01); *H04W 24/10* (2013.01);
(Continued)

(58) Field of Classification Search
None
See application file for complete search history.

(56) References Cited

U.S. PATENT DOCUMENTS

2009/0303937 A1   10/2009   Sawahashi et al.
2010/0177725 A1   7/2010    Van Rensburg
(Continued)

FOREIGN PATENT DOCUMENTS

CN   101702700 A   5/2010
CN   101841916 A   9/2010
(Continued)

OTHER PUBLICATIONS

Samsung, Interference Measurement for Downlink CoMP, 3GPP TSG RAN WG1 #66bis, Zhuhai, China, Oct. 10-14, 2011, R1-113091.
(Continued)

*Primary Examiner* — Yaotang Wang
(74) *Attorney, Agent, or Firm* — Jefferson IP Law, LLP

(57) ABSTRACT

The present disclosure relates to a method of providing a pre-$5^{th}$-Generation (5G) or 5G communication system for supporting higher data rates Beyond $4^{th}$-Generation (4G) communication system, such as Long Term Evolution (LTE). The method includes receiving configuration information comprising at least one information element indicating transmission resources for the reference signals, receiving downlink control information indicating that a transmission of at least one of the reference signals is activated, and receiving the at least one of the reference signals based on the configuration information, in response to receiving the downlink control information.

20 Claims, 14 Drawing Sheets

(51) Int. Cl.
*H04W 72/08* (2009.01)
*H04W 24/10* (2009.01)

(52) U.S. Cl.
CPC ........... *H04W 72/085* (2013.01); *H04L 5/006* (2013.01); *H04L 5/0048* (2013.01)

(56) References Cited

U.S. PATENT DOCUMENTS

| | | |
|---|---|---|
| 2010/0246527 A1 | 9/2010 | Montojo et al. |
| 2010/0273499 A1 | 10/2010 | Van Rensburg et al. |
| 2010/0291940 A1 | 11/2010 | Koo et al. |
| 2011/0134867 A1 | 6/2011 | Lee et al. |
| 2011/0194551 A1 | 8/2011 | Lee et al. |
| 2011/0199986 A1 | 8/2011 | Fong et al. |
| 2011/0205930 A1 | 8/2011 | Rahman et al. |
| 2011/0261770 A1 | 10/2011 | Yu et al. |
| 2011/0281537 A1 | 11/2011 | Wu |
| 2012/0020230 A1 | 1/2012 | Chen et al. |
| 2012/0026986 A1 | 2/2012 | Dass |
| 2012/0027111 A1 | 2/2012 | Vook et al. |
| 2012/0147773 A1* | 6/2012 | Kim ................. H04L 1/0025 370/252 |
| 2012/0287875 A1* | 11/2012 | Kim ................. H04B 7/024 370/329 |
| 2012/0315859 A1 | 12/2012 | Lee et al. |
| 2012/0327785 A1 | 12/2012 | Zhang et al. |
| 2013/0039203 A1 | 2/2013 | Fong et al. |
| 2013/0301465 A1* | 11/2013 | Seo ................... H04B 7/0626 370/252 |
| 2014/0086092 A1 | 3/2014 | Chen et al. |
| 2014/0211731 A1 | 7/2014 | Inoue et al. |

FOREIGN PATENT DOCUMENTS

| | | |
|---|---|---|
| EP | 1892987 A1 | 2/2008 |
| KR | 10-2001-0030605 A | 4/2001 |
| KR | 10-2011-0082050 A | 7/2011 |
| WO | 2010/044522 A2 | 4/2010 |
| WO | 2011/013986 A2 | 2/2011 |
| WO | 2011/088403 A1 | 7/2011 |
| WO | 2011/100672 A1 | 8/2011 |
| WO | 2011/105726 A2 | 9/2011 |
| WO | 2011/115421 A2 | 9/2011 |
| WO | 2011/140876 A1 | 11/2011 |

OTHER PUBLICATIONS

Extended European Search Report dated Oct. 23, 2019, issued in European Patent Application No. 19186626.8.

* cited by examiner

METHOD AND APPARATUS FOR TRANSMITTING AND RECEIVING REFERENCE SIGNAL

PRIORITY

This application is a continuation application of prior application Ser. No. 13/742,757, filed on Jan. 16, 2013, which has claimed the benefit under 35 U.S.C. § 119(a) of a Korean patent application filed in the Korean Intellectual Property Office on Jan. 16, 2012 and assigned Serial No. 10-2012-0004666, the entire disclosure of each of which is hereby incorporated by reference.

BACKGROUND OF THE INVENTION

1. Field of the Invention

The present invention relates to a wireless mobile communication system. More particularly, the present invention relates to a method for effectively transmitting and receiving a Channel State Information-Reference Signal (CSI-RS) and measuring interference.

2. Description of the Related Art

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Current mobile communication systems are developing, beyond the initial level of providing voice-oriented services, into a high quality wireless packet data communication system in order to provide a data service and a multimedia service. To this end, various standardization organizations, such as the 3rd Generation Partnership Project (3GPP), the 3GPP2, and the Institute of Electrical and Electronics Engineers (IEEE), are preparing 3rd generation evolution mobile communication system standards employing multiple access schemes using multi-carriers. Recently, various mobile communication standards, including Long Term Evolution (LTE) of the 3GPP, Ultra Mobile Broadband (UMB) of the 3GPP2, and 802.16m of the IEEE, have been developed in order to support a high speed-high quality wireless packet data transmission service based on a multiple access scheme using a multi-carrier.

The current 3rd generation evolution mobile communication systems, such as LTE, UMB, and 802.16m, are based on a multiple carrier multiple access scheme, employ multiple antennas based on a Multiple Input Multiple Output (MIMO) scheme, and use various technologies, such as beam-forming, Adaptive Modulation and Coding (AMC), channel sensitive scheduling, and the like. These technologies improve the system capacity performance by, for example, concentrating a transmission power of multiple antennas or controlling the quantity of data transmitted from the antennas according to the channel qualities and selectively transmitting data to a user having a good channel quality. These techniques are based on the channel state information between a base station or an evolved Node B (eNB) and a mobile station or a User Equipment (UE). Therefore, an eNB or a UE needs to measure the channel state between them, and a CSI-RS is used in the measurement. The eNB refers to an apparatus for downlink transmission and uplink reception, which is located at a predefined position, and one eNB performs transmission and reception with respect to cells. In one mobile communication system, a plurality of eNBs are geographically scattered and each eNB performs transmission and reception with respect to the cells.

A reference signal is a signal used for demodulation and decoding of a received data symbol by measuring channel states, such as the intensity or distortion of a channel, the intensity of interference, Gaussian noise, or the like, between an eNB and a UE. Furthermore, a receiver can determine the channel state of a wireless channel between the receiver and a transmitter by measuring an intensity of a signal received through the wireless channel, which has been transmitted with a predefined transmission power by the transmitter. The measured channel state of the wireless channel is used by the receiver to determine a data rate which the receiver will request from the transmitter.

The resources of time, frequency, and transmission power are limited in a mobile communication system. Therefore, an increase in the quantity of resources allocated to a reference signal may decrease the quantity of resources that can be allocated to transmission of traffic channels and thus may reduce the absolute quantity of transmitted data. In this case, although the performances of channel measurement and estimation may be improved, the reduced absolute quantity of transmitted data may rather decrease the performance of the entire system throughput. Therefore, in order to obtain an optimum performance in view of the entire system throughput, a proper distribution between resources for the reference signal and resources for transmission of traffic channels is necessary.

FIG. 1 illustrates transmission of various signals in a Physical Resource Block (PRB) pair in a Long Term Evolution-Advanced (LTE-A) system according to the related art.

Referring to FIG. 1, one PRB pair includes 14 Orthogonal Frequency Division Multiplexing (OFDM) symbols along the time axis and 12 subcarriers along the frequency axis. The 14 OFDM symbols and the 12 subcarriers form 168 (=14×12) Resource Elements (REs), wherein each RE corresponds to a resource having an orthogonality with respect to a neighboring RE. In the PRB pair, a Physical Downlink Shared Channel (PDSCH) used for transmission of traffic data, a Cell-Specific Reference Signal (CRS) transmitted for each cell, a Physical Downlink Control Channel (PDCCH)

used for transmission of a control signal, a Demodulation Reference Signal (DMRS) used for reception of a PDSCH, and a CSI-RS used for measuring a downlink channel state and generating channel state information are allocated different REs for transmission. The CSI-RS supported in an LTE-A system can support signals for one antenna port, 2 antenna ports, 4 antenna ports, and 8 antenna ports, and the number of REs allocated in one PRB pair are different according to the number of antenna ports of the CSI-RS as illustrated in FIG. 1.

FIG. 2 illustrates a transmission of a CSI-RS having four antenna ports in one PRB pair in an LTE-A system according to the related art.

Referring to FIG. 2, as indicated by reference numerals 200 and 210, sequences for four CSI-RS antenna ports are spread by orthogonal codes, Code-Division-Multiplexed (CDM), and transmitted to four REs. The sequences for CSI-RS port 0 and CSI-RS port 1 are transmitted using the sequences for CSI-RS port 2 and CSI-RS port 3 and another RE pair. In this way, sequences for a plurality of CSI-RS antenna ports may be transmitted using a plurality of REs. In a case of an LTE-A system, since transmission to a maximum of 8 CSI-RS antenna ports is possible, an eNB can transmit CSI-RSs for a maximum of 8 transmission antennas.

In the case of an LTE-A system, transmission and reception can be performed using CSI-RSs supporting a maximum of 8 CSI-RS transmission antennas to one transmission point as described above. In a case of performing a beam forming transmission using a maximum of 8 transmission antennas, a beam forming gain of a maximum of 9 dB is obtained, so as to improve the Signal to Interference and Noise Ratio (SINR).

Therefore, a need exists for a method and an apparatus for transmitting a reference signal for effective data transmission and reception, measuring interference, and generating channel state information in a MIMO transmission and reception.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for transmitting a reference signal for effective data transmission and reception, measuring interference, and generating channel state information in a Multiple Input Multiple Output (MIMO) transmission and reception.

Another aspect of the present invention is to provide an effective transmission and reception method in a MIMO system having scores or more transmission antennas.

In accordance with an aspect of the present invention, a method of transmitting a reference signal for generation of channel state information by an evolved Node B (eNB) in a wireless communication system is provided. The method includes transmitting a first reference signal to a plurality of User Equipments (UEs), receiving channel state information generated based on the first reference signal from the plurality of UEs, selecting candidate UEs to which wireless resources are to be allocated and transmitting second reference signals to the selected candidate UEs, receiving channel state information generated based on the second reference signals from the candidate UEs, and selecting final UEs, to which wireless resources are to be allocated, from the candidate UEs based on the channel state information generated based on the second reference signals, and transmitting control information for data reception to the selected final UEs.

In accordance with another aspect of the present invention, a method of receiving a reference signal for generation of channel state information by a UE in a wireless communication system is provided. The method includes receiving a first reference signal from an eNB, generating channel state information based on the first reference signal, and transmitting the generated channel state information to the eNB, receiving a second reference signal from the eNB, generating channel state information based on the second reference signal, and transmitting the generated channel state information to the eNB, and receiving control information for data reception from the eNB.

In accordance with another aspect of the present invention, an eNB apparatus for transmitting a reference signal for generation of channel state information in a wireless communication system is provided. The eNB apparatus includes a first reference signal transmitter for generating a first reference signal and for transmitting the first reference signal to a plurality of UEs, a second reference signal transmitter for receiving channel state information generated based on the first reference signal from the plurality of UEs, for selecting candidate UEs to which wireless resources are to be allocated, for generating second reference signals, and for transmitting the second reference signals to the selected candidate UEs, a controller for controlling the first reference signal transmitter and the second reference signal transmitter, for receiving channel state information generated based on the second reference signals from the candidate UEs, for selecting final UEs, to which wireless resources are to be allocated, from the candidate UEs based on the channel state information generated based on the second reference signals, and for transmitting control information for data reception to the selected final UEs, a mapper for mapping signals output from the first reference signal transmitter, the second reference signal transmitter, and the controller to wireless resources, and for transmitting the signals through the wireless resources.

In accordance with another aspect of the present invention, a UE apparatus for receiving a reference signal for generation of channel state information in a wireless communication system is provided. The UE apparatus includes a first reference signal receiver for receiving a first reference signal from an eNB and for generating channel state information based on the first reference signal, a second reference signal receiver for receiving a second reference signal from the eNB and for generating channel state information based on the second reference signal, a controller for receiving control information for data reception from the eNB and for controlling the first reference signal receiver and the second reference signal receiver, and a demapper for identifying the first reference signal, the second reference signal, and a control signal.

In accordance with another aspect of the present invention, a method of transmitting a reference signal for generation of channel state information by an eNB in a wireless communication system is provided. The method includes grouping a plurality of transmission antennas into a plurality of antenna groups, transmitting the reference signal to UEs in different time intervals or frequency intervals according to the antenna groups, and transmitting another reference signal for all of the antenna groups in an identical time interval or frequency interval.

In accordance with another aspect of the present invention, a method of transmitting a reference signal for generation of channel state information by an eNB in a wireless communication system is provided. The method includes grouping a plurality of beams transmitted through a plurality of transmission antennas into a plurality of beam groups, transmitting the reference signal to UEs in different time intervals or frequency intervals according to the beam groups, and transmitting another reference signal for all of the antenna groups in an identical time interval or frequency interval.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
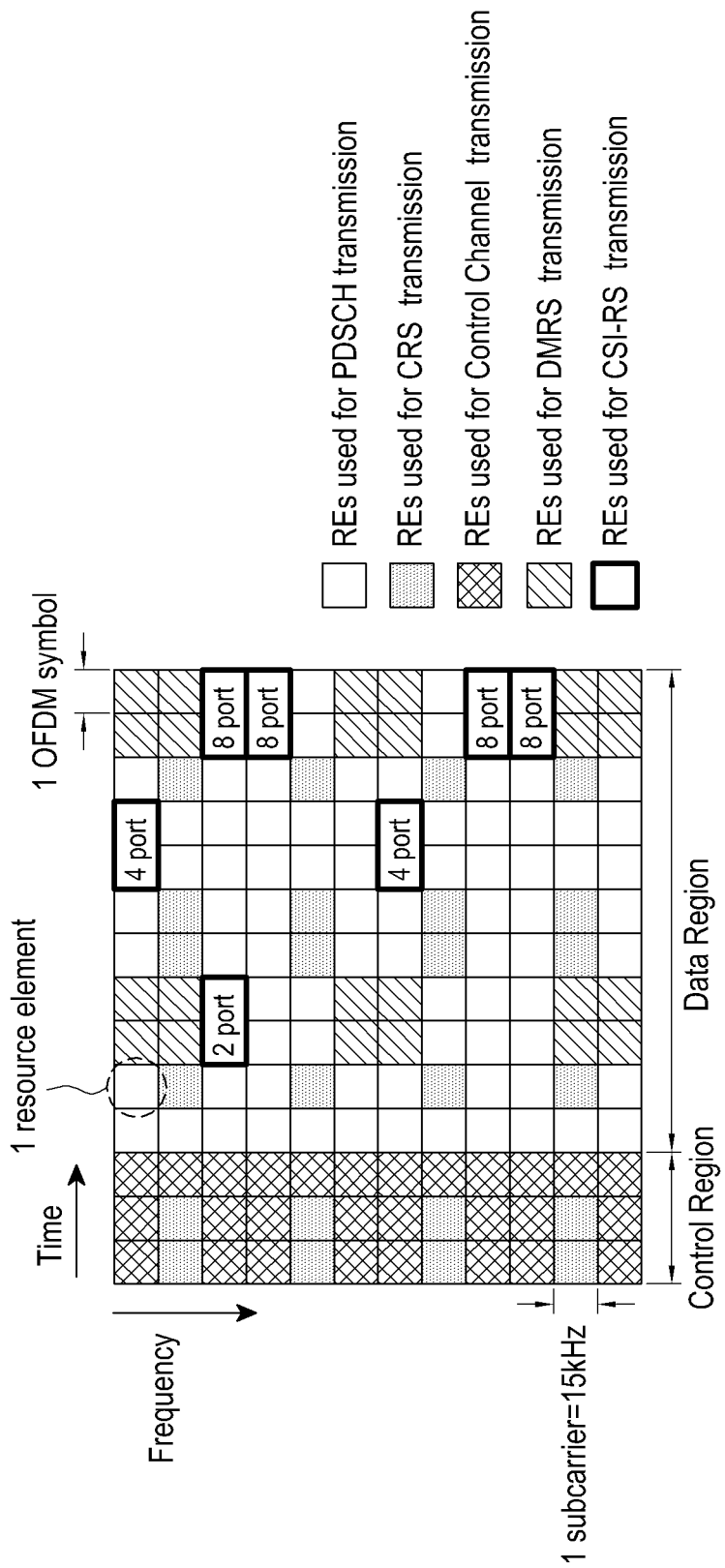
FIG. 1 illustrates a transmission of various signals in a Physical Resource Block (PRB) pair in a Long Term Evolution-Advanced (LTE-A) system according to the related art.
Figure 2:
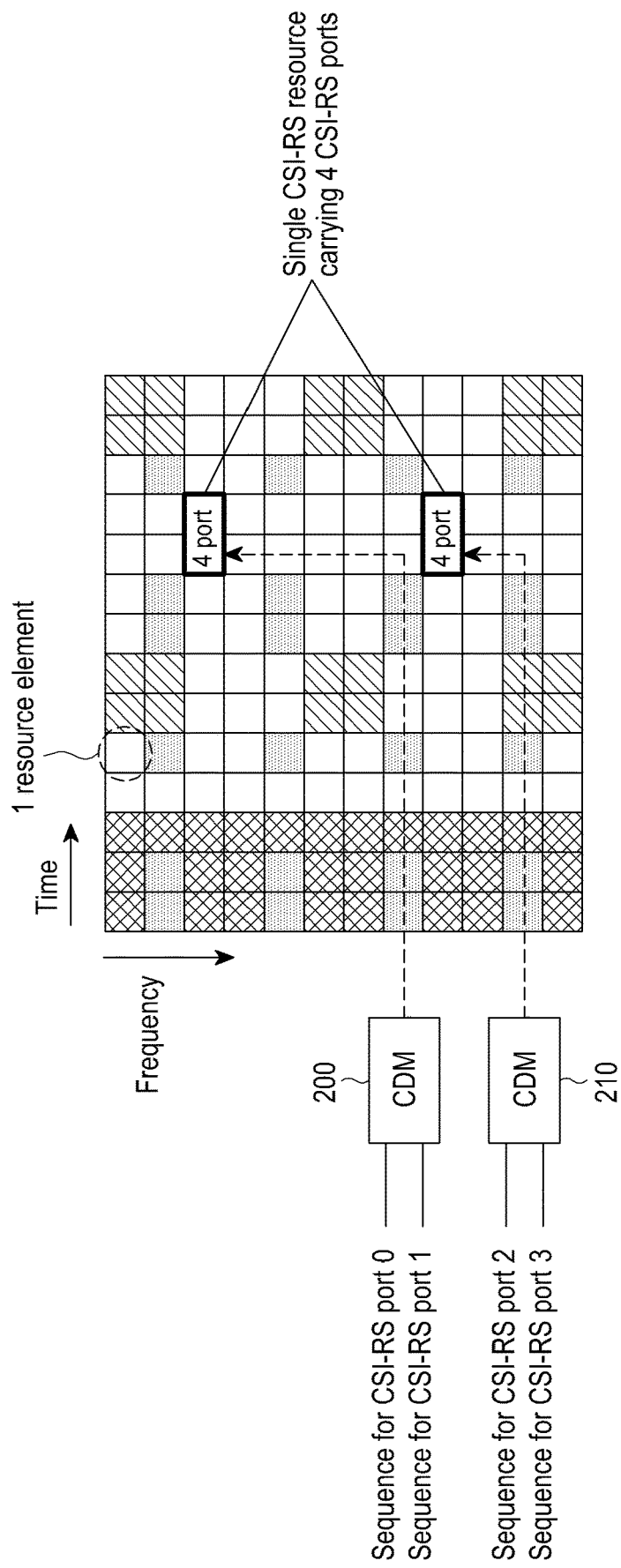
FIG. 2 illustrates a transmission of a Channel State Information-Reference Signal (CSI-RS) having four antenna ports in one PRB pair in an LTE-A system according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Furthermore, although the following detailed description of exemplary embodiments of the present invention mainly discusses an Orthogonal Frequency Division Multiplexing (OFDM) based wireless communication system, especially an Enhanced Universal Mobile Telecommunications System Terrestrial Radio Access (EUTRA) standard of the 3rd Generation Partnership Project (3GPP), the principal idea of the present invention can be applied to other communication systems having similar technical backgrounds and channel types with slight modifications without departing from the scope of the present invention.

First, an exemplary method of effective transmission and reception of a reference signal in a massive Multiple Input Multiple Output (MIMO) wireless communication system which transmits data by using scores or more transmission antennas will be described.

FIGS. 3 through 15, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Figure 3:
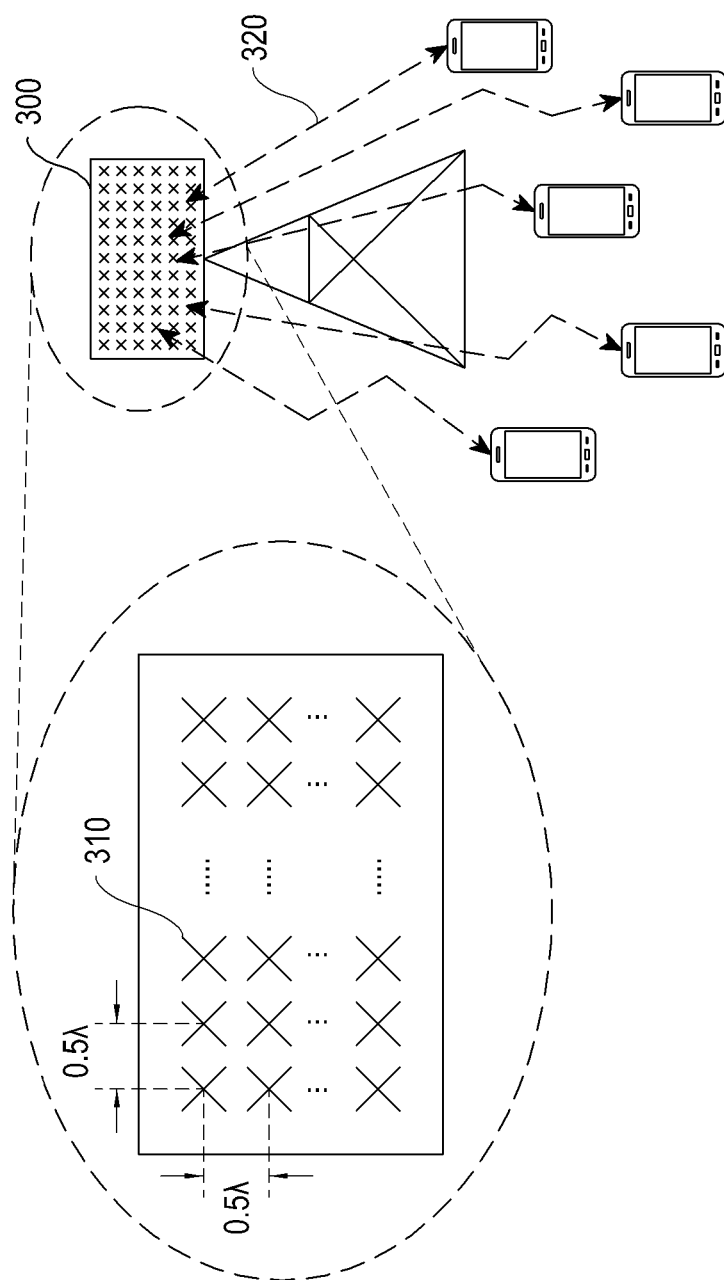
FIG. 3 illustrates a structure of a massive Multiple Input Multiple Output (MIMO) system according to an exemplary embodiment of the present invention.

FIG. 3 illustrates a structure of a massive MIMO system according to an exemplary embodiment of the present invention.

Referring to FIG. 3, a base station transmitter (i.e., an evolved Node B (eNB)) 300 transmits a wireless signal through scores or more transmission antennas. The transmission antennas are arranged while maintaining a minimum distance (e.g., 0.5λ in FIG. 3) between each other as indicated by reference numeral 310. For example, the minimum distance may be one-half of the wavelength of the transmitted wireless signal. In general, when a distance corresponding to one-half of a wavelength of a transmitted wireless signal is maintained between transmission antennas, the signal transmitted from each transmission antenna is influenced by a wireless channel having a low correlation. When a band of a transmitted wireless channel is 2 GHz, the minimum distance is 7.5 cm. As the band of the transmitted wireless channel becomes higher than 2 GHz, this distance becomes shorter.

Referring to FIG. 3, the scores or more transmission antennas arranged in the eNB 300 are used in transmitting a signal to one User Equipment (UE) or a plurality of UEs as indicated by reference numeral 320. A proper precoding scheme is applied to a plurality of transmission antennas, so as to enable simultaneous transmission to the plurality of transmission antennas. At this time, one UE can receive one or more spatial channels. In general, the number of spatial channels which one UE can receive is determined depending on the number of reception antennas owned by the UE and the channel condition. However, in the case of simultaneous transmission to a plurality of UEs as illustrated in FIG. 3, signals transmitted to different UEs may cause interference (i.e., a multi-user MIMO interference) between them, according to the combination of precoding schemes. The multi-user MIMO interference has an influence which increases in proportion to the number of UEs simultaneously receiving a signal from an eNB, and weakens the signal receiving performance. More specifically, in a massive MIMO system as illustrated in FIG. 3, the multi-user MIMO interference is a main factor having an influence on the performance.

Therefore, in order to effectively implement a massive MIMO system, a UE should precisely measure the channel state and the size of interference and transmit effective channel state information to an eNB by using the measured information. Upon receiving the channel state information from the UE, the eNB determines UEs to which it will make a downlink transmission, a data transmission speed for the transmission, and a precoding scheme to be applied. Since the massive MIMO system includes a large number of transmission antennas, an application of the reference signal transmission method of the related art and its measuring method used in the Long Term Evolution (LTE)/LTE-Advanced (LTE-A) system may cause performance degradation. Furthermore, the method of the related art can neither measure the multi-user MIMO interference precisely, which is caused by the simultaneous transmission to a plurality of UEs, nor reflect the interference in the channel state information.

Therefore, an exemplary embodiment of the present invention provides an effective Channel State Information-Reference Signal (CSI-RS) transmission and reception method in a massive MIMO system.

In a massive MIMO transmission and reception based on an LTE/LTE-A system, an important subject is to maintain the backward compatibility. Here, the backward compatibility refers to a function capable of transmitting or receiving a wireless signal to or from UEs of the related art having no capability of receiving a massive MIMO signal, according to a scheme of the related art other than the MIMO scheme, simultaneously while operating a massive MIMO function in an LTE/LTE-A system. For example, the backward compatibility needs a capability of simultaneously transmitting a wireless signal to both a UE supporting massive MIMO and a UE not supporting massive MIMO by using the same frequency and time resources while preventing performance degradation of the UE supporting massive MIMO during the transmission or reception of the signal transmitted to the UE not supporting massive MIMO.

In order to satisfy the conditions as described above, an exemplary embodiment of the present invention proposes a method of transmitting a CSI-RS for a massive MIMO system by using CSI-RS resources of the related art introduced in the LTE-A. The CSI-RS resources of the related art introduced in the LTE-A support a maximum of 8 transmission antennas. Therefore, in order to use the CSI-RS resources of the related art, a method capable of transmitting a signal through scores or more transmission antennas is needed. In order to transmit a CSI-RS through scores or more transmission antennas by using limited resources as described above, an eNB divides the transmission antennas into a plurality of groups.

Figure 4:
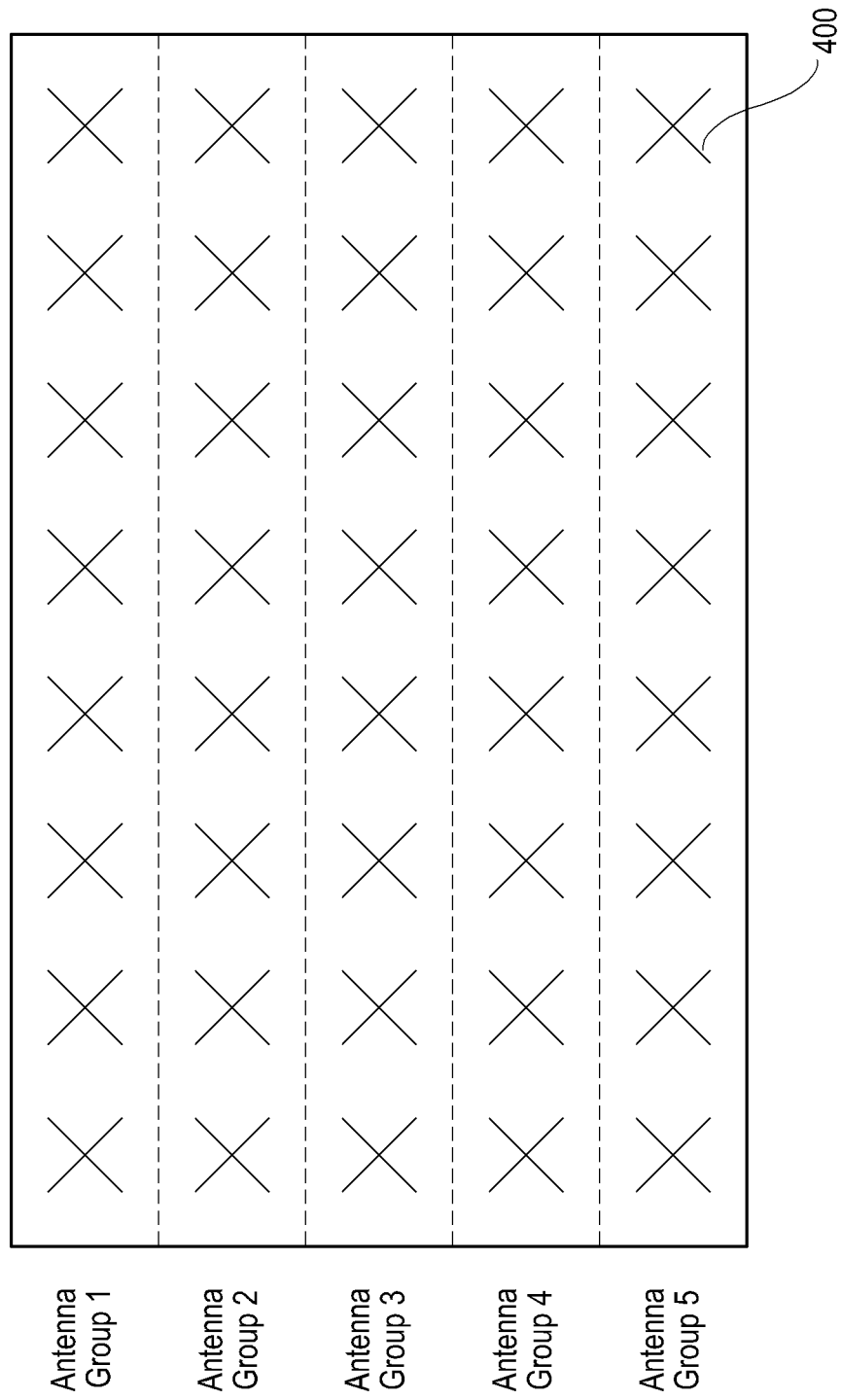
FIG. 4 illustrates an antenna grouping according to an exemplary embodiment of the present invention.

FIG. 4 illustrates an antenna grouping according to an exemplary embodiment of the present invention.

Referring to FIG. 4, 40 transmission antennas (as indicated by reference numeral 400), which have been grouped into five antenna groups, are illustrated as an example of a massive MIMO system. One antenna group includes 8 transmission antennas. Although the grouping is made based on actual transmission antennas in FIG. 4, the grouping may be made based on virtual transmission antennas other than the actual transmission antennas. Furthermore, the antenna grouping may be commonly applied to both the actual transmission antennas and the virtual transmission antennas. In general, a virtual transmission antenna refers to an individual antenna signal which can be identified by a UE, and is implemented by a signal transmitted from an actual transmission antenna.

CSI-RSs for massive MIMO are transmitted to each UE for each group of multiple antennas as illustrated in FIG. 4, so that CSI-RSs for more transmission antennas than the 8 transmission antennas supported by the LTE-A are transmitted.

Figure 5:
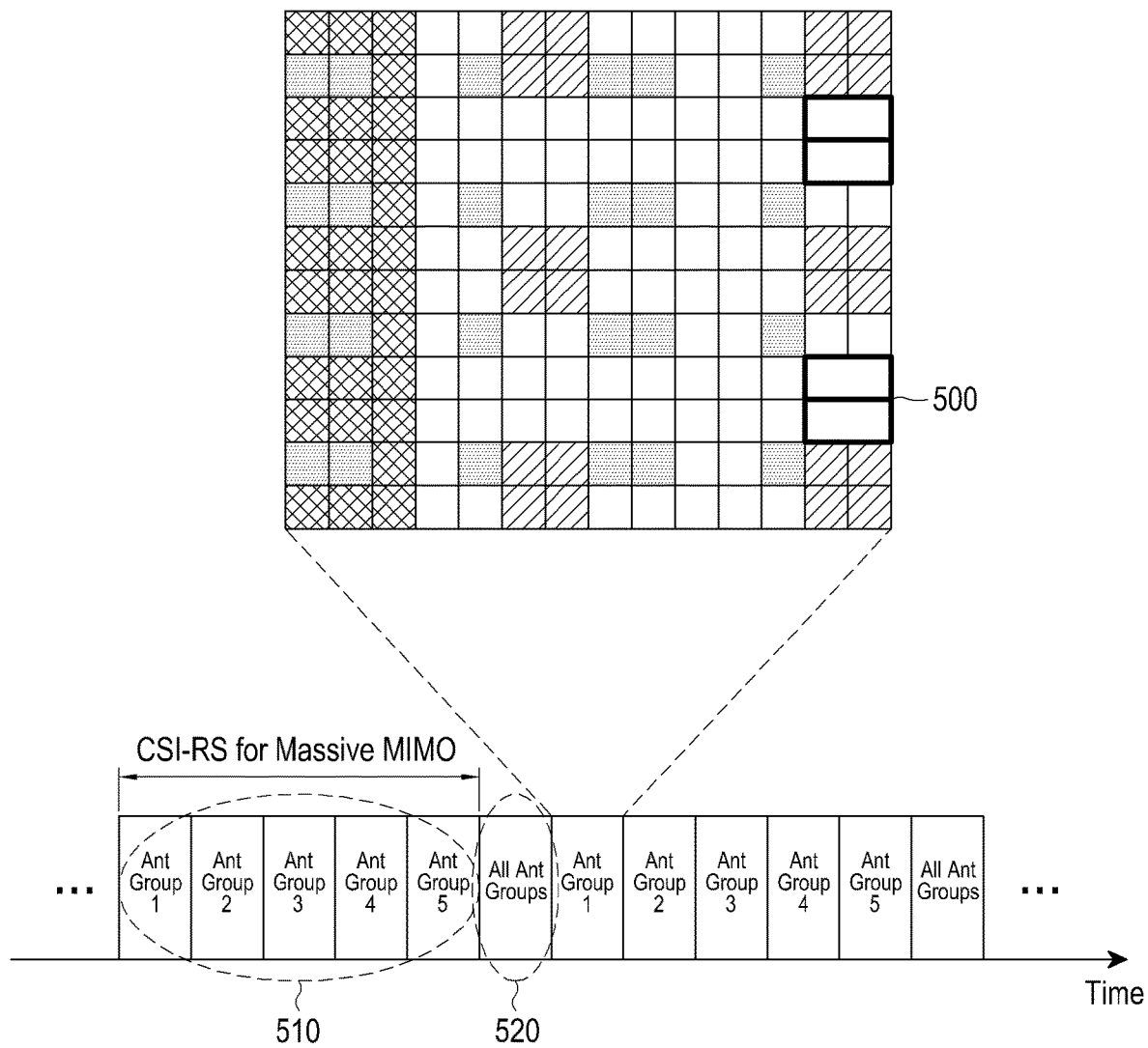
FIG. 5 illustrates a transmission of CSI-RSs for massive MIMO according to an exemplary embodiment of the present invention.

FIG. 5 illustrates transmission of CSI-RSs for massive MIMO according to an exemplary embodiment of the present invention.

Referring to FIG. 5, the CSI-RSs for massive MIMO are transmitted at different time intervals according to the respective antenna groups in FIG. 4. In FIG. 5, one time interval corresponds to one subframe in an LTE/LTE-A system. The subframe is a time unit used for resource allocation in an LTE/LTE-A system and corresponds to 1 msec. For example, antenna groups 1 through 5 in FIG. 4 are allocated transmission time intervals and transmit CSI-RSs in the allocated transmission time intervals. In FIG. 4, since each antenna group includes 8 transmission antennas, each antenna group transmits a CSI-RS in each transmission interval by using one CSI-RS resource (as indicated by reference numeral 500 of FIG. 5) for 8 ports. In the transmission described above, each transmission antenna has an individual transmission resource in transmitting a CSI-RS, and the UE can measure the channel state in each transmission antenna. The channel state in each transmission antenna needs to be measured for determination of an optimum precoding scheme in massive MIMO. In contrast, UEs which do not support massive MIMO cannot receive signals transmitted from a large number of antennas as illustrated in FIG. 4 in a discriminated manner according to the antennas. For such UEs, separately from the CSI-RS 510 for massive MIMO, CSI-RSs 520 for non-massive MIMO with respect to all antenna groups are transmitted. The CSI-RSs 520 may be transmitted through a virtual antenna. Furthermore, the CSI-RSs for non-massive MIMO may also be effectively used for simultaneous signal transmission to a plurality of UEs. UEs which do not support massive MIMO can receive non-massive MIMO CSI-RSs for a maximum of 8 transmission antennas supported in the LTE-A. Such UEs cannot receive the CSI-RSs 510 for massive MIMO of FIG. 5 and measure the channel state of each transmission antenna. Therefore, for such UEs, the eNB implements a smaller number of virtual transmission antennas than the number of actual transmission antennas and transmits a signal for these antennas through one CSI-RS resource. When CSI-RSs for non-massive MIMO are transmitted for the UEs which do not support massive MIMO as described above, the UEs cannot discriminately measure the channel state of the individual transmission antennas. However, a plurality of transmission antennas are allocated to each virtual transmission antenna and a relatively higher transmission power is thus used for signal transmission. Furthermore, the higher the transmission power allocated to each virtual transmission antenna, the more precise the channel state measured by a UE.

Although an individual time resource allocated to each antenna group is used for transmission of CSI-RSs for massive MIMO in FIG. 5, not only the individual time resource but also an individual frequency resource may be allocated for transmission of the CSI-RSs for massive MIMO.

Figure 6:
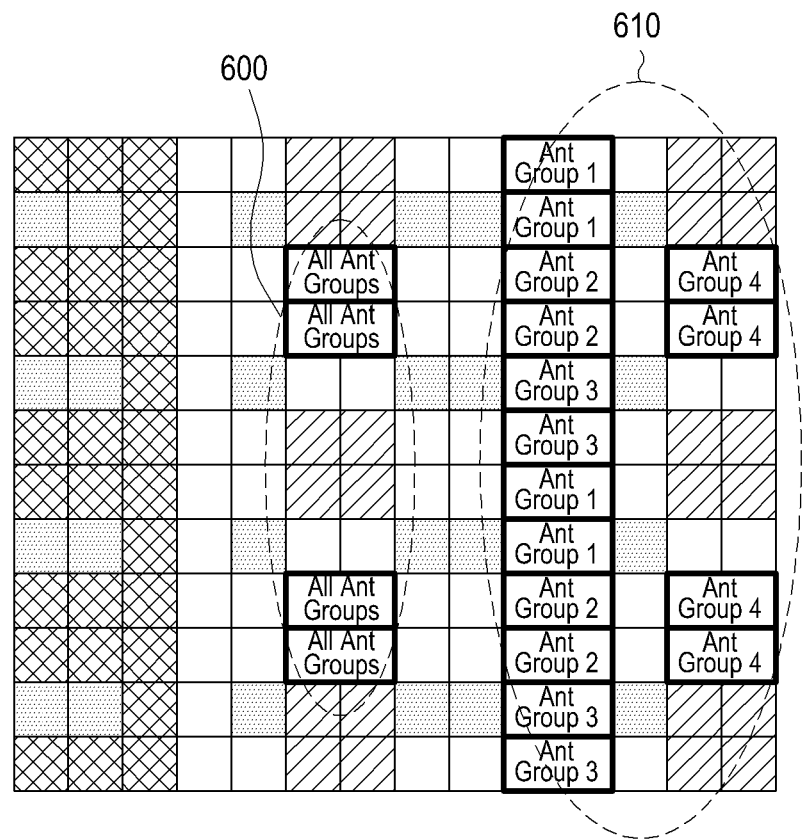
FIG. 6 illustrates a transmission of CSI-RSs for massive MIMO by allocation of individual frequency resources according to an exemplary embodiment of the present invention.

FIG. 6 illustrates a transmission of CSI-RSs for massive MIMO by allocation of individual frequency resources according to an exemplary embodiment of the present invention.

Referring to FIG. 6, CSI-RSs 600 for massive MIMO are transmitted in a time interval corresponding to one subframe. It is noted from FIG. 6 that CSI-RSs 610 for a plurality of antenna groups are transmitted by different OFDM symbols or subcarriers within the same subframe.

In order to transmit the CSI-RSs for massive MIMO, it is possible to use not only the above two methods of allocating an individual time resource or an individual frequency resource to each antenna group as illustrated in FIGS. 5 and 6 but also a method of allocating time and frequency resources by complexly using the two methods.

In order to transmit the CSI-RSs for massive MIMO as illustrated in FIGS. 5 and 6, an eNB should notify a UE of related control information before transmitting a CSI-RS. The control information is imperative for proper reception of the CSI-RSs for massive MIMO and proper determination of the channel state based on the received CSI-RSs by the UE. Such control information may include at least one of the following:

1) Information on the number of transmission antennas which configure the CSI-RSs for massive MIMO;

2) Information on the number of antenna groups which configure the CSI-RSs for massive MIMO;

3) Information on the number of transmission antennas which configure each of the antenna groups configuring the CSI-RSs for massive MIMO;

4) Information on the time and frequency resource positions at which the CSI-RSs for massive MIMO are transmitted, wherein this information includes positions of time and frequency resources at which a CSI-RS for each antenna group is transmitted;

5) Time period by which the CSI-RSs for massive MIMO are transmitted;

6) Information on the transmission power of the CSI-RSs for massive MIMO, which includes a ratio between the transmission power of the CSI-RSs and the transmission power of a Physical Downlink Shared Channel (PDSCH), and the like; and 7) An initial state value used for generation of a scrambling sequence of the CSI-RSs for massive MIMO.

Furthermore, in relation to the non-massive MIMO, the control information may include at least one of the following:

1) Information on the number of transmission antennas which configure the CSI-RSs for non-massive MIMO;

2) Information on the time and frequency resource positions at which the CSI-RSs for non-massive MIMO are transmitted;

3) Time period by which the CSI-RSs for non-massive MIMO are transmitted;

4) Information on the transmission power of the CSI-RSs for non-massive MIMO, which includes a ratio between the transmission power of the CSI-RSs and the transmission power of PDSCH, and the like; and 5) An initial state value used for generation of a scrambling sequence of the CSI-RSs for non-massive MIMO.

The information on the transmission power of the CSI-RSs for massive MIMO and the information on the transmission power of the CSI-RSs for non-massive MIMO are control information used for a UE to receive each CSI-RS and determine a precise channel state. Among the above information, the control information relating to the CSI-RSs for massive MIMO and the control information relating to the CSI-RSs for non-massive MIMO are transferred to the UE, separately from the CSI-RSs. According to whether the information relates to massive MIMO or non-massive MIMO, different methods are used in determining the channel state. Therefore, for effective communication, the UE needs to know whether the above two types of information are for massive MIMO or non-massive MIMO. For example, the UE may receive both the control information relating to the CSI-RSs for massive MIMO and the control information relating to the CSI-RSs for non-massive MIMO, and the eNB may send additional control information, by which it is possible to determine whether the control information is for massive MIMO or for non-massive MIMO, to the UE.

The above description discusses a method of transmitting CSI-RSs for massive MIMO after dividing the CSI-RSs according to the antenna groups. In this method, a UE determines the channel state information by measuring the channel state of each antenna. Therefore, allocation of individual transmission resources is imperative for channel measurement of each antenna. This method can be effectively used when sufficient transmission power can be allocated to each transmission antenna. In contrast, when it is impossible to allocate a sufficient transmission power to each transmission antenna, it is more efficient to generate a plurality of beams by an eNB and select one or more beams among the generated beams by the UE, than to measure the channel state of each antenna. In the method of using a plurality of beams as described above, each beam is transmitted using an individual transmission resource and beams are generated using the same multiple transmission antennas, but different precoding schemes are applied to the antennas according to the beams. For example, although beam1 and beam2 are transmitted using the same 40 transmission antennas, the precoding scheme applied to beam1 and the precoding scheme applied to beam2 are different from each other.

When CSI-RSs for massive MIMO are transmitted using a plurality of beams transmitted after being differently precoded, the plurality of beams may be grouped into a plurality of beam groups for transmission, as in the above case of grouping the multiple transmission antennas into multiple antenna groups for transmission.

Figure 7:
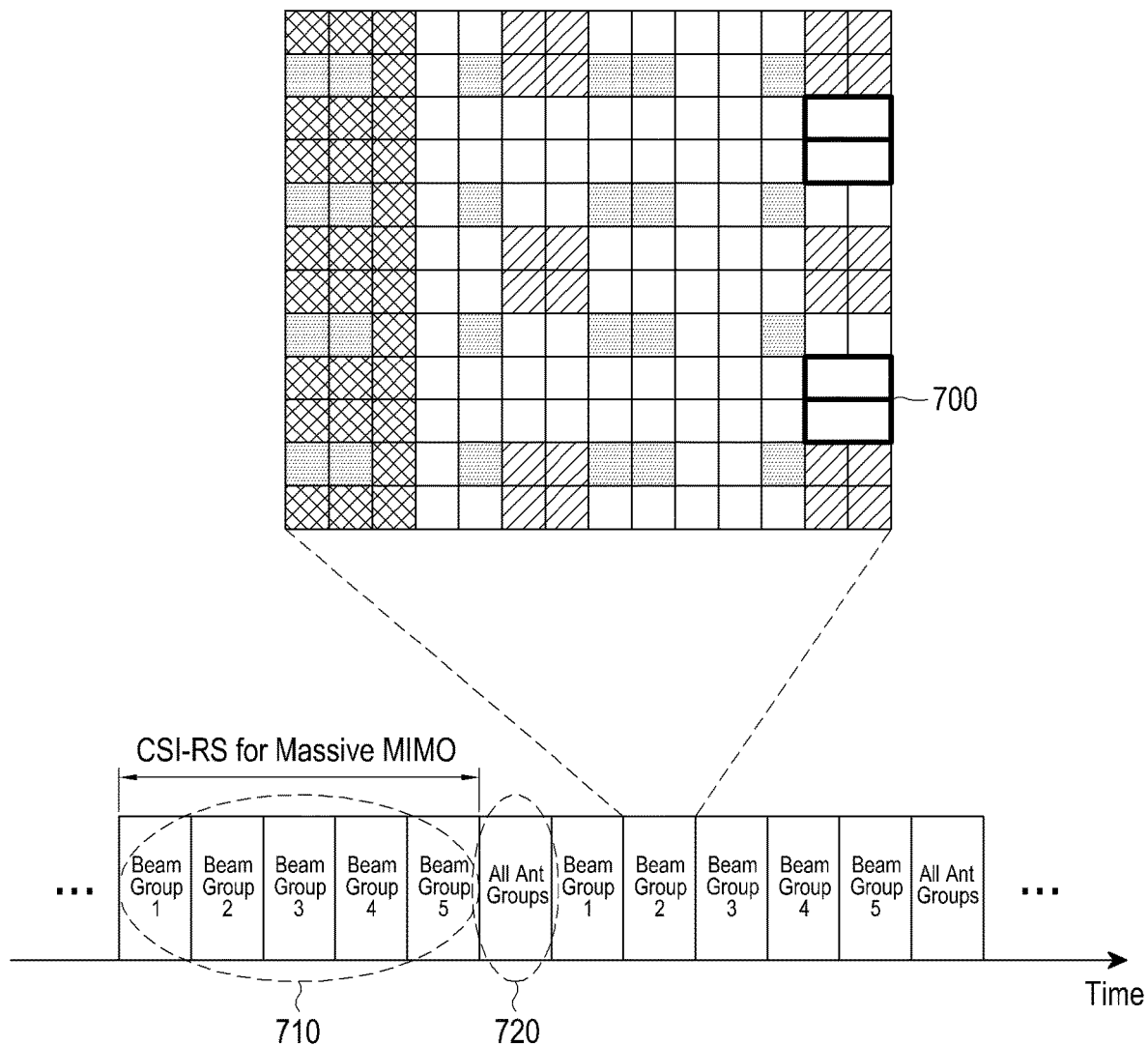
FIG. 7 illustrates a grouping of a plurality of beams into five beam groups, wherein each beam group is transmitted in an individual time interval, according to an exemplary embodiment of the present invention.

FIG. 7 illustrates a grouping of a plurality of beams into five beam groups, wherein each beam group is transmitted in an individual time interval, according to an exemplary embodiment of the present invention.

Referring to FIG. 7, five beam groups 710 are illustrated, each antenna group includes 8 transmission antennas, and each antenna group transmits CSI-RSs by using one CSI-RS resource 700 for 8 ports in each transmission interval. Although CSI-RSs for massive MIMO are transmitted using a particular CSI-RS resource within a subframe as indicated by reference numeral 720, CSI-RSs for a large number of beams may be transmitted by performing transmission for different beam groups according to subframes.

Figure 8:
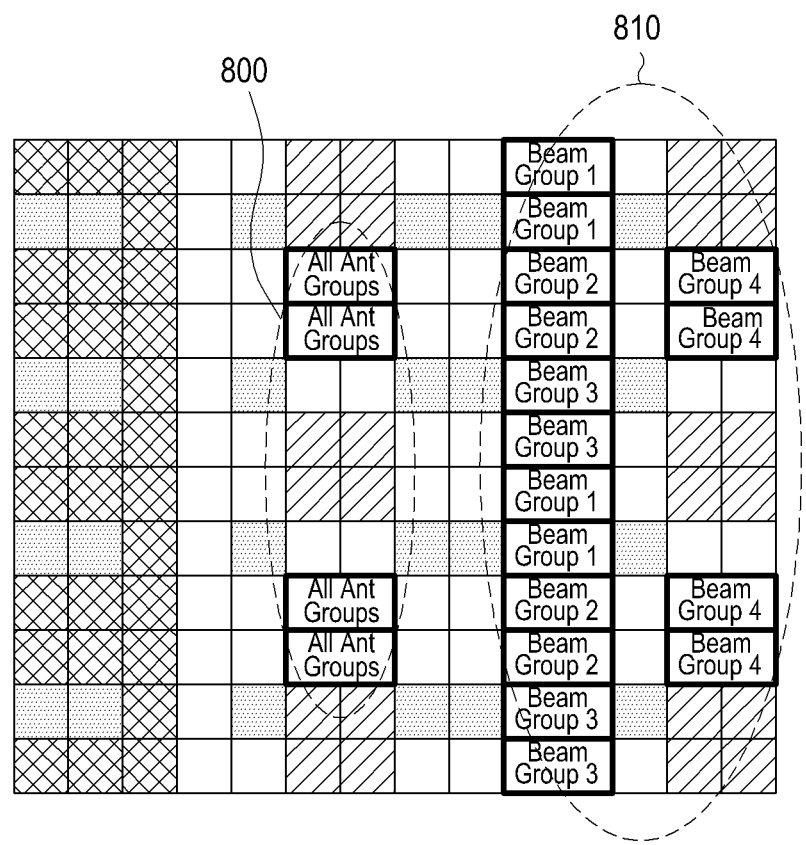
FIG. 8 illustrates a transmission of CSI-RSs for a plurality of beams by allocating not only individual time resources but also individual frequency resources according to an exemplary embodiment of the present invention.

FIG. 8 illustrates a transmission of CSI-RSs for a plurality of beams by allocating not only individual time resources but also individual frequency resources according to an exemplary embodiment of the present invention.

Referring to FIG. 8, CSI-RSs 800 for massive MIMO transmitted in a time interval corresponding to one subframe and individual frequency resources 810 are illustrated.

Hereinafter, a link adaptation method in a massive MIMO system is described.

For effective data transmission and reception using massive MIMO, it is imperative to efficiently use multi-user MIMO which simultaneously transmits a wireless signal to a plurality of UEs. A system using massive MIMO may have scores or more transmission antennas. In order to use such a large number of antennas, simultaneous transmission of wireless signals to a large number of UEs is needed. In the case of simultaneously transmitting wireless signals to a large number of UEs, a signal for other UEs may generate a multi-user MIMO interference and the size of the interference increases according to an increase in the number of UEs participating in the multi-user MIMO. For example, in the case of performing multi-user MIMO for simultaneous transmission to 10 UEs, one UE among the 10 UEs may be subjected to multi-user MIMO interference by the signals transmitted from the other 9 UEs, which causes performance degradation of the one UE.

Furthermore, since signal transmission to a large number of UEs is simultaneously performed, it may be necessary to use, in spite of an optimum precoding in view of a particular UE, another precoding in consideration of the quantity of interference incurred to another UE. In a case of an LTE/LTE-A system, a UE notifies an eNB of a precoding optimum for the UE together with information on supportable data rates when the optimum precoding is applied. Since the information on the supportable data rates is available only when the precoding is applied, it is impossible to know the data rates which the UE can support when the eNB applies a precoding which is not requested by the UE. In general, this problem is known as an inaccuracy of the link adaption.

An exemplary embodiment of the present invention proposes a link adaptation method for addressing the problems occurring due to the inaccuracy of the link adaption as described above.

Figure 9:
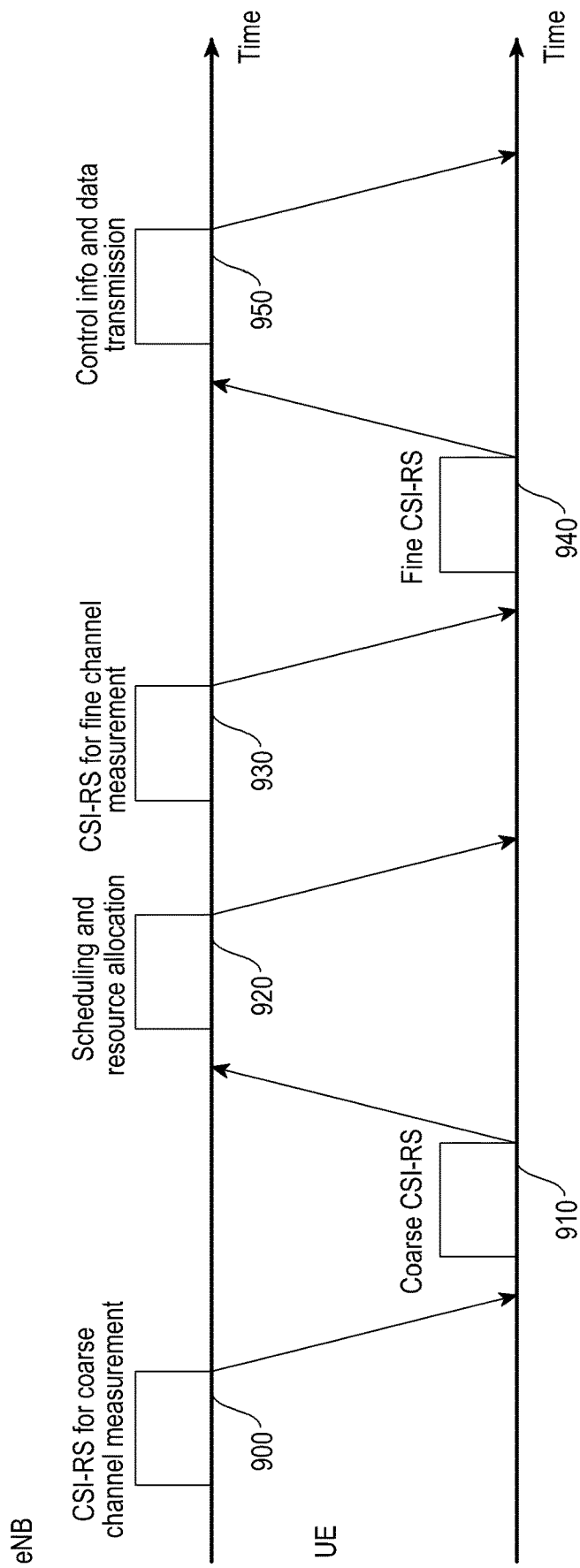
FIG. 9 illustrates a link adaptation method according to an exemplary embodiment of the present invention.

FIG. 9 illustrates a link adaptation method according to an exemplary embodiment of the present invention.

Referring to FIG. 9, an eNB transmits a CSI-RS (i.e., a coarse CSI) 900 for first channel measurement to a UE. Upon receiving the CSI-RS, the UE notifies the eNB of first channel state information 910 by using the CSI-RS. When the CSI-RS 900 for the first channel measurement is a periodic signal, the first channel state information 910 may also be periodically notified information. The first channel state information 910 may be notified of by each of multiple UEs. By using the notified first channel state information as described above, the eNB first determines UEs to which wireless resources for data transmission are to be allocated, in the step indicated by reference numeral 920. The selected UEs are known as wireless resource allocation candidate UEs. In the step indicated by reference numeral 930, the wireless resource allocation candidate UEs determined by the eNB in the step indicated by reference numeral 920 are notified that they should receive second CSI-RSs from the eNB. The wireless resource allocation 920 and the second CSI-RS notification 930 may be simultaneously performed in the same time interval. In the step indicated by reference numeral 940, the UE having received the second CSI-RS (i.e., fine CSI-RS) notifies the eNB of second channel state information by using the second CSI-RS. Upon receiving the second channel state information, the eNB selects UEs to which actual downlink wireless resources are to be allocated, and transmits control information needed for reception of a traffic channel to the selected UEs, in the step indicated by reference numeral 950. The UEs allocated the actual downlink wireless resources may be different from the wireless resource allocation candidate UEs.

The second CSI-RS is different from the first CSI-RS in view of at least one of the following:

1) The first CSI-RS is a signal simultaneously received by a plurality of UEs, while different signals according to UEs are allocated and transmitted as the second CSI-RSs;

2) The first CSI-RS is a signal which is periodically transmitted and received by a plurality of UEs, while the second CSI-RS is received by only some of the UEs having received the first CSI-RS and the eNB determines whether to transmit the second CSI-RS;

3) The first CSI-RS is transmitted through all frequency bands, in order to enable a UE to measure all frequency bands and find the best frequency band. In contrast, the second CSI-RS is transmitted in fewer than all of the frequency bands according to a determination of the eNB, because the eNB has already found a frequency band most proper for the UE; and 4) A UE having measured the first CSI-RS determines an optimum precoding based on the first CSI-RS. In contrast, the second CSI-RS does not require a process of determining an optimum precoding since it is a signal to which a precoding determined to be optimum for a corresponding UE by the eNB has been already applied.

The second channel state information transmitted by the UE having received the second CSI-RS may be reported by means of a value relative to the first channel state information. For example, if a Signal to Interference and Noise Ratio (SINR) or a data rate among the first channel state information is A and an SINR or a data rate measured by a UE having received a second CSI-RS is (A+Δ), the UE does not notify (A+Δ) but notifies only Δ as the second channel state information. Such transmission of a relative value as the channel state information as described above reduces the information quantity of the second channel state information, so as to reduce the overhead in the uplink transmission by the UE.

Figure 10:
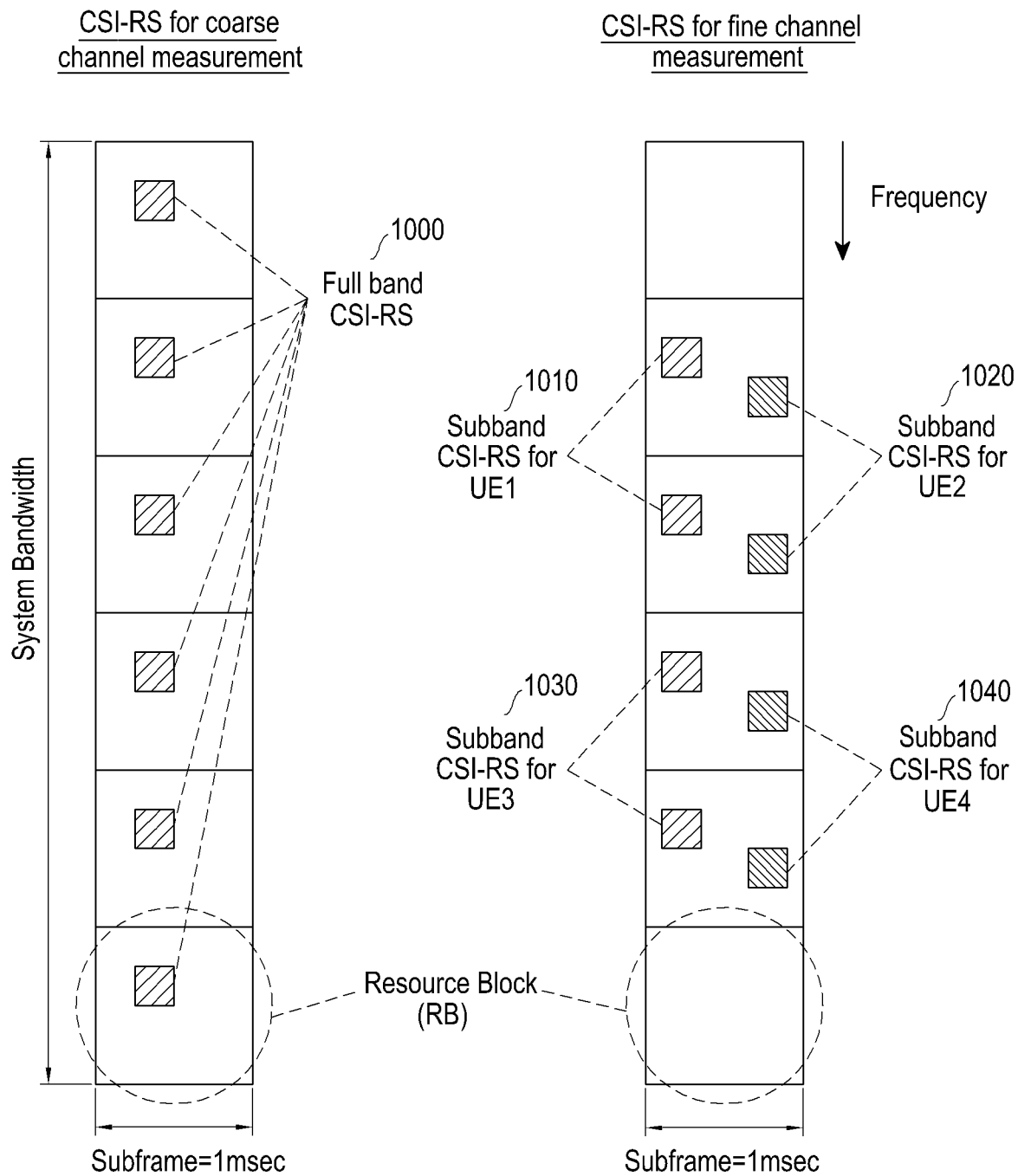
FIG. 10 illustrates a transmission of a first CSI-RS and a second CSI-RS in a frequency band according to an exemplary embodiment of the present invention.

FIG. 10 illustrates a transmission of a first CSI-RS and a second CSI-RS in a frequency band according to an exemplary embodiment of the present invention.

Referring to FIG. 10, the first CSI-RS 1000 is a signal which is transmitted in all Resource Blocks (RBs) of the system bandwidth and is received by a plurality of UEs. In contrast, the second CSI-RSs 1010, 1020, 1030, and 1040 are signals, which may be individually allocated to UEs and may be transmitted in only some of the RBs of the system bandwidth. Furthermore, as illustrated in FIG. 10, a plurality of second CSI-RSs may be transmitted in the same subframe and RB. For example, although the second CSI-RSs 1010 and 1020 are signals for different UEs, they are transmitted using the same RB in the same subframe.

In order to receive the second CSI-RSs, the eNB should transfer control information for receiving the second CSI-RSs to the UE. The control information for receiving the second CSI-RSs may be notified to the UE by the eNB through transmission as indicated by reference numeral 920 in FIG. 9. The control information includes at least one of the following:

1) Information on a UE to which the second CSI-RS corresponds. This information may be transmitted either by defining separate control information or by initializing a Cyclic Redundancy Check (CRC) code of a control channel into UE-specific indicator information (UE ID);

2) Information on a frequency band (i.e., an RB) to which the second CSI-RS is transmitted;

3) Information on a time interval (i.e., a subframe) to which the second CSI-RS is transmitted;

4) Information on a CSI-RS transmission resource used for transmission of the second CSI-RS when a plurality of CSI-RS transmission resources exists within the RB and the subframe through which the second CSI-RS is transmitted;

5) Information on the number of transmission antenna ports through which the second CSI-RS is transmitted; and 6) Ratio of transmission power between the second CSI-RS and a PDSCH transmitted for a data signal.

The control information is imperative for reception of a second CSI-RS allocated to a UE by the UE. Moreover, the eNB may notify a corresponding UE of information needed for reception of a second CSI-RS allocated to UEs other than the corresponding UE. The reason why the eNB notifies a UE of information needed for reception of a second CSI-RS allocated to the other UEs is in order to enable the UE to measure the multi-user MIMO interference generated at the time of multi-user MIMO transmission by receiving the second CSI-RS allocated to the other UEs. In order to receive the second CSI-RS allocated to the other UEs for measurement of the multi-user MIMO interference, information imperative for reception of the second CSI-RS allocated to the other UEs is needed as is the information imperative for reception of the second CSI-RS allocated to the UE itself. The information imperative for reception of the second CSI-RS may be transmitted through a Physical Downlink Control Channel (PDCCH) or an Enhanced-PDCCH (E-PDCCH), which are control channels supported in the LTE/LTE-A. Notification of all information relating to the second CSI-RS to a UE by using a PDCCH or an E-PDCCH as described above may generate an excessive downlink overhead. In order to avoid such an excessive downlink overhead, some of the information may be set using a higher layer signaling while only indispensible information is transmitted using a PDCCH or an E-PDCCH.

Furthermore, the second CSI-RS of FIG. 10 is not transmitted in all frequency bands but is transmitted in fewer than all of the frequency bands. The reason why the second CSI-RS is transmitted in fewer than all of the frequency bands is to transmit the second CSI-RS in the same band as the frequency band in which a data signal is transmitted. Accordingly, it is possible to precisely determine the channel state of the frequency band in which the data is transmitted. One method capable of reducing the quantity of control information for the second CSI-RS, which should be transmitted through a PDCCH or an E-PDCCH, is to semi-statically set the transmission resources for the second CSI-RS.

Figure 11:
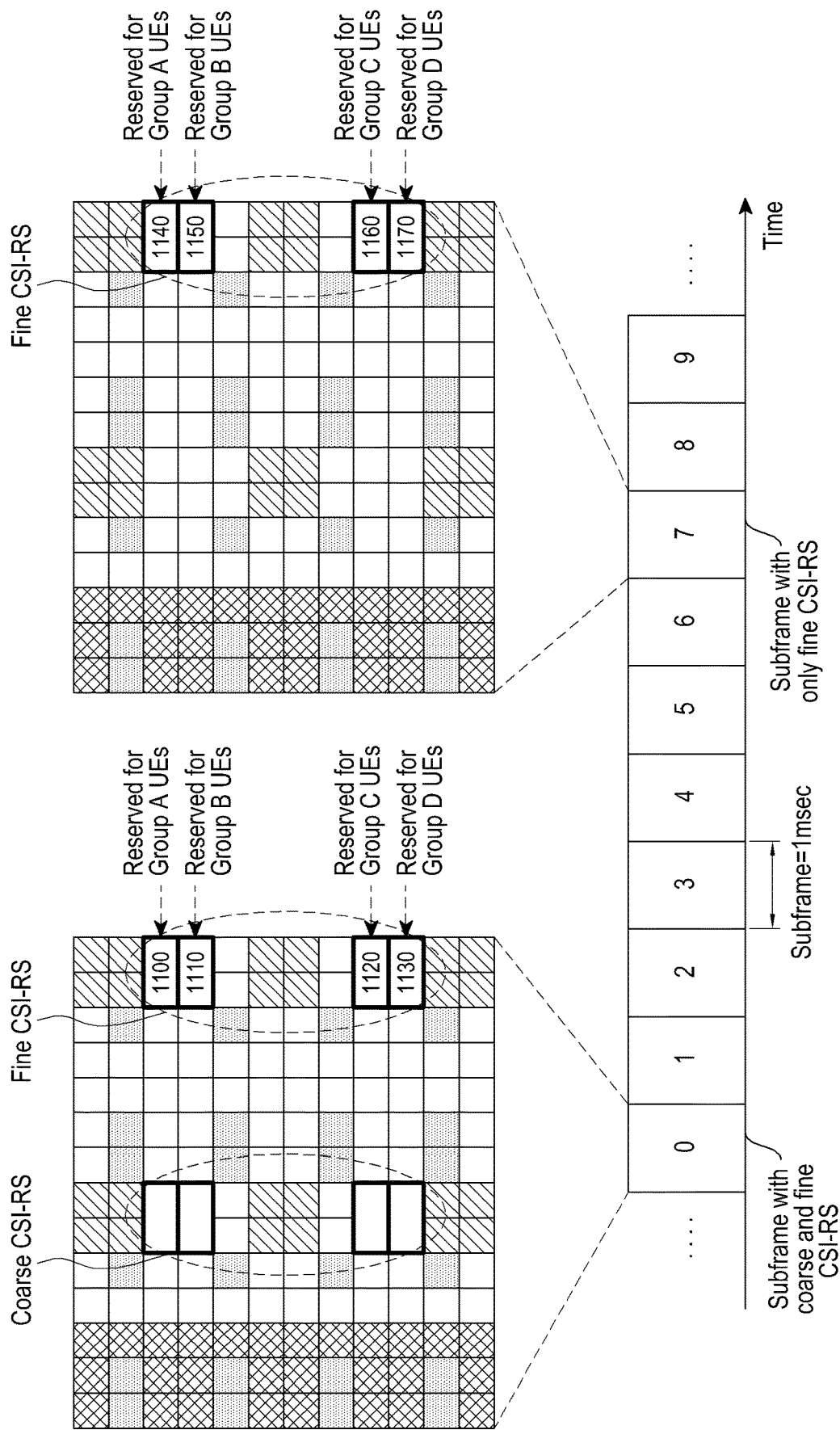
FIG. 11 illustrates a transmission of first CSI-RSs and second CSI-RSs for respective subframes according to an exemplary embodiment of the present invention.

FIG. 11 illustrates a transmission of first CSI-RSs and second CSI-RSs for respective subframes according to an exemplary embodiment of the present invention.

Referring to FIG. 11, first CSI-RSs and second CSI-RSs are simultaneously transmitted in subframe 0. In subframe 0, both the first CSI-RSs and second CSI-RSs are transmitted using CSI-RS transmission resources 1100, 1110, 1120, and 1130. In subframe 7, only the second CSI-RSs are transmitted using CSI-RS transmission resources 1140, 1150, 1160, and 1170. Furthermore, it is noted that the CSI-RS transmission resources 1100, 1110, 1120, and 1130 have been allocated to UEs appointed by the eNB. For example, the CSI-RS transmission resource 1100 has been allocated to enable UEs belonging to Group A to receive the second CSI-RS. For example, when a UE belonging to Group A receives a notification from the eNB that a second CSI-RS for the UE itself is allocated to a particular RB or RBs, the UE can identify a CSI-RS transmission resource in which the second CSI-RS for the UE itself exists, among a plurality of CSI-RS transmission resources existing in the particular RB or RBs. This method can reduce the downlink overhead because it makes it unnecessary for the UE to transmit, through a PDCCH or an E-PDCCH, separate control information about which one is allocated among a plurality of CSI-RS transmission resources. Furthermore, when a UE belonging to Group A in FIG. 11 receives a notification from the eNB that a second CSI-RS for the UE itself is allocated to a particular RB(s), the UE can identify that the second CSI-RS for the UE itself exists in the CSI-RS transmission resource 1100 and that CSI-RSs for other UEs exist in the other CSI-RS transmission resources 1110, 1120, and 1130. By using this information, the UE can determine a multi-user MIMO interference generated in the same RB(s) as that of the UE itself by measuring the reception power carried by the CSI-RS transmission resources 1110, 1120, and 1130.

When predefined CSI-RS resources are set for the second CSI-RSs as illustrated in FIG. 11, at least one of the following should be notified to a UE by using a higher layer signaling:

1) Information on CSI-RS transmission resources for the second CSI-RSs to be allocated to the UE; and 2) Information on CSI-RS transmission resources for the second CSI-RSs to be allocated to other UEs.

When the UE having received the information described above receives a notification that a second CSI-RS has been allocated to itself through a PDCCH or an E-PDCCH, the UE receives a signal for measurement of a wireless channel in the CSI-RS transmission resource through which the second CSI-RS of the UE itself is transmitted and receives a signal for measurement of a multi-user MIMO interference in the other CSI-RS transmission resource.

Hereinafter, an exemplary method of measuring an interference signal in a massive MIMO system will be described.

For effective data transmission and reception using massive MIMO, a UE needs to effectively determine a multi-user MIMO interference generated in massive MIMO transmission and reception. Although the above description proposes an exemplary method of measuring a multi-user MIMO interference by using second CSI-RSs allocated to other UEs, exemplary embodiments of the present invention can be applied to a method of measuring a multi-user MIMO interference by directly measuring second CSI-RSs allocated to other UEs and a method of measuring a multi-user MIMO interference by allocating an interference measurement resource to each UE to which a second CSI-RS is allocated.

The interference measurement resource refers to a wireless resource used when a particular UE measures the size of interference applied to the particular UE itself, and is used when a UE has received a second CSI-RS and needs to determine a precise channel state information. The interference measurement resource includes one or more REs, through which a wireless signal transmitted to a UE allocated the interference measurement resource is not carried and only wireless signals transmitted to the other UEs are carried. For example, when UE1 has been allocated a particular interference measurement resource, the eNB transmits only transmission signals for the other UEs without transmitting a transmission signal for UE1 through the particular interference measurement resource, so that UE1 can measure only the multi-user MIMO interference. The UE having received only the transmission signals for the other UEs through the particular interference measurement resource can measure a precise multi-user MIMO interference.

Each UE may be notified of whether the interference measurement resource has been allocated or not, through a PDCCH or an E-PDCCH. In this case, the eNB may notify allocation of the interference measurement resource to the UE simultaneously while notifying whether the second CSI-RS has been allocated.

Figure 12:
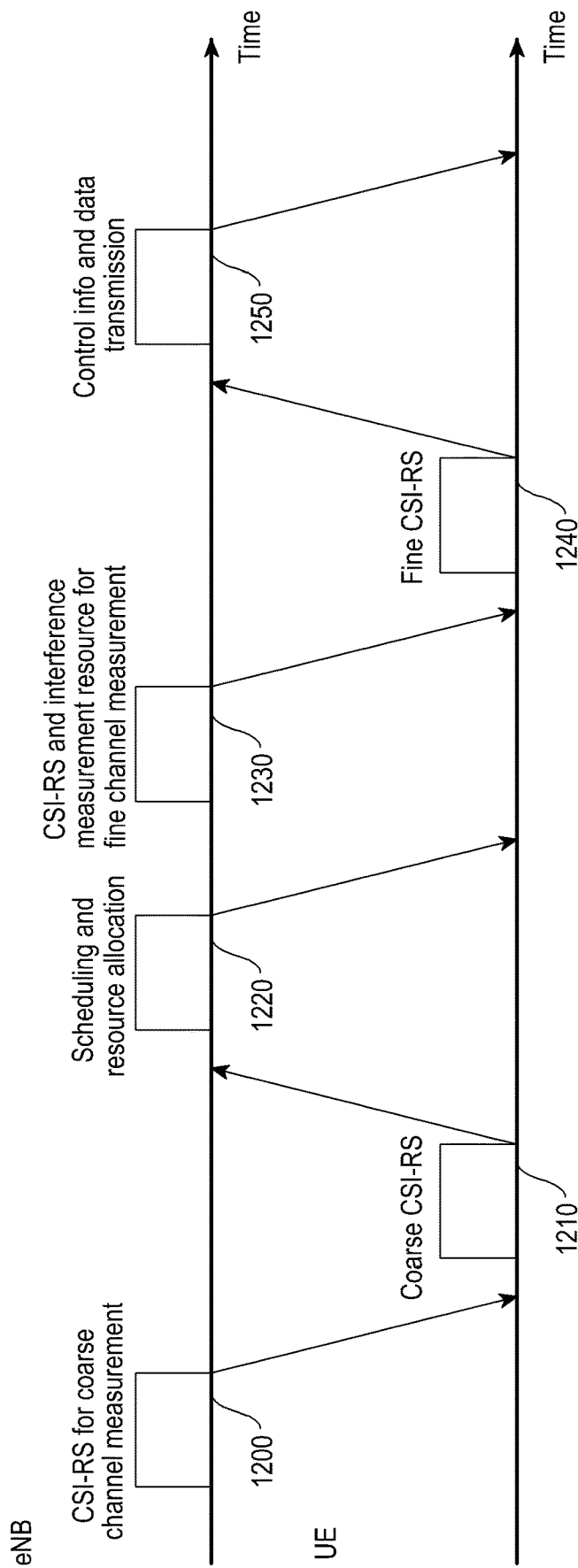
FIG. 12 illustrates a notification of an allocation-or-not of a second CSI-RS and an allocation of an interference measurement resource to a User Equipment (UE) by an evolved Node B (eNB) according to an exemplary embodiment of the present invention.

FIG. 12 illustrates a notification of an allocation-or-not of a second CSI-RS and an allocation of an interference measurement resource to a UE by an eNB according to an exemplary embodiment of the present invention.

Referring to FIG. 12, it is the same as FIG. 9 except for the part indicated by reference numeral 1230. For example, in FIG. 12, an eNB transmits a CSI-RS (i.e., a coarse CSI) 1200 for first channel measurement to a UE. Upon receiving the CSI-RS, the UE notifies the eNB of first channel state information 1210 by using the CSI-RS. When the CSI-RS 1200 for the first channel measurement is a periodic signal, the first channel state information 1210 may also be periodically notified information. The first channel state information 1210 may be notified of by each of multiple UEs. By using the notified first channel state information as described above, the eNB selects wireless resource allocation candidate UEs, in the step indicated by reference numeral 1220.

In the step indicated by reference numeral 1230, the wireless resource allocation candidate UEs determined by the eNB in the step indicated by reference numeral 1220 are notified that they should receive second CSI-RSs from the eNB. Furthermore, in the step indicated by reference numeral 1220, the eNB notifies allocation of the second CSI-RS and the interference measurement resource to the UE. The wireless resource allocation 1220 and the second CSI-RS notification 1230 may be simultaneously performed in the same time interval. In the step indicated by reference numeral 1240, the UE having received the second CSI-RS (i.e., fine CSI-RS) notifies the eNB of second channel state information by using the second CSI-RS. Upon receiving the second channel state information, the eNB selects UEs to which actual downlink wireless resources are to be allocated, and transmits control information needed for reception of a traffic channel to the selected UEs, in the step indicated by reference numeral 1250.

The control information for notification of the interference measurement resource transmitted in the step indicated by reference numeral 1230 includes at least one of the following:

1) Information on a UE to which the interference measurement resource corresponds. This information may be transmitted either by defining separate control information or by initializing a CRC code of a control channel into UE-specific indicator information (UE ID);

2) Information on a frequency band (i.e., an RB) in which the interference measurement resource exists;

3) Information on a time interval (i.e., a subframe) in which the interference measurement resource exists; and 4) Information on a CSI-RS transmission resource to be used for transmission of the interference measurement resource when a plurality of interference measurement resources exists within the RB and the subframe through which the interference measurement resource is transmitted.

In addition to the exemplary method illustrated in FIG. 12 in which an interference measurement resource is allocated using a control channel, such as a PDCCH or an E-PDCCH, there is an exemplary method in which an interference measurement resource of a fixed position is allocated using a higher layer signaling. In this exemplary method, when a UE is allocated a second CSI-RS, the UE uses an interference measurement resource set through a higher layer signaling among RBs in which the second CSI-RSs exist. This exemplary method is advantageous in that it is not necessary to transmit separate control information through a PDCCH or an E-PDCCH in order to allocate an interference measurement resource. Another exemplary method is to link an interference measurement resource and a CSI-RS transmission resource of a second CSI-RS. In this exemplary method, an interference measurement resource allocated to a UE becomes different according to the CSI-RS transmission resource used by the second CSI-RS allocated to the UE.

Figure 13:
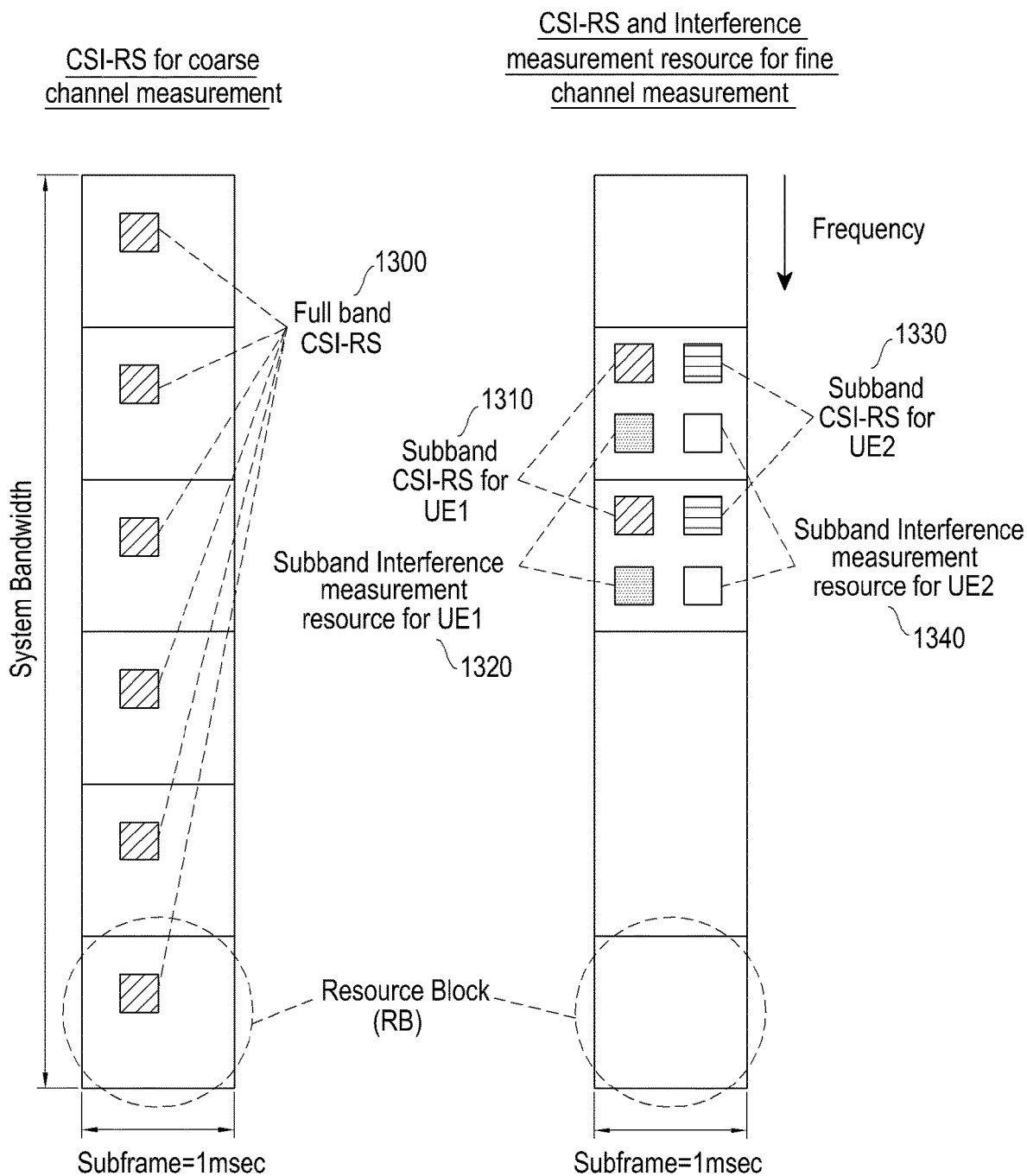
FIG. 13 illustrates an allocation of interference measurement resources in a frequency band according to an exemplary embodiment of the present invention.

FIG. 13 illustrates an allocation of interference measurement resources in a frequency band according to an exemplary embodiment of the present invention.

Referring to FIG. 13, the first CSI-RS 1300 is a signal which is transmitted in all RBs of the system bandwidth and is received by a plurality of UEs. A specific second CSI-RS and a specific interference measurement resource have been allocated to each of the two UEs in the two same RBs. UE1 measures the channel state of the wireless channel by using the second CSI-RSs 1310 and measures the quantity of interference by using the interference measurement resources 1320. UE2 measures the channel state of the wireless channel by using the second CSI-RSs 1330 and measures the quantity of interference by using the interference measurement resources 1340. It is noted that the interference measurement resources and the second CSI-RSs occupy the same frequency band. Such occupying of the same frequency band is intended to enable channel estimation and interference measurement to be performed in the frequency band in which actual data is to be transmitted, so as to obtain a more precise determination of the channel state information. Furthermore, the interference measurement resources and the second CSI-RSs are not transmitted in all frequency bands but are transmitted in fewer than all of the frequency bands. Such transmission in fewer than all of the frequency bands is also performed in only the same band as a particular frequency band in which a data signal is to be transmitted, so as to obtain a more precise determination of the channel state information of the particular frequency band in which the data signal is to be transmitted.

Figure 14:
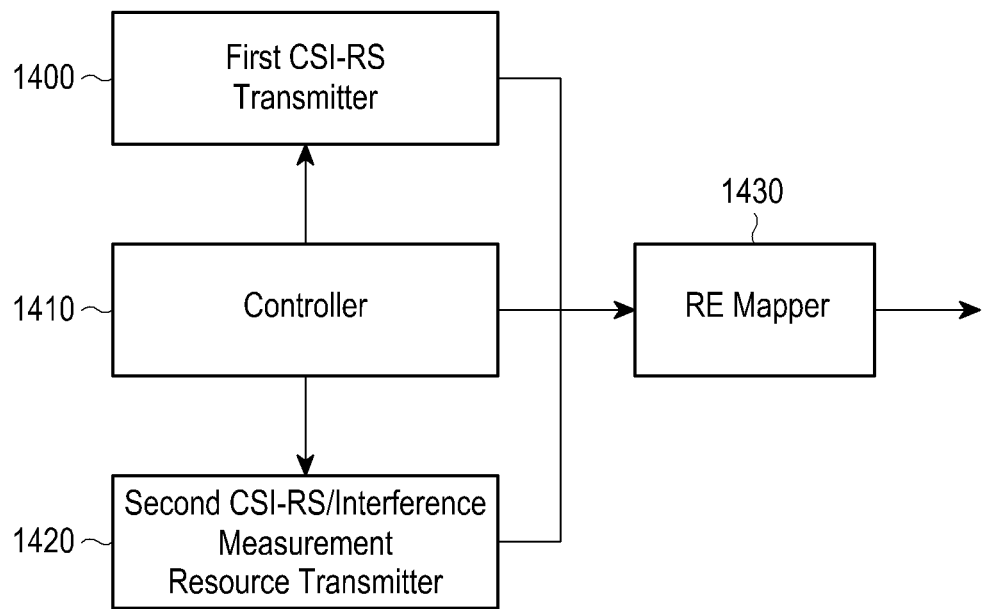
FIG. 14 illustrates a transmission apparatus according to an exemplary embodiment of the present invention.

FIG. 14 illustrates a transmission apparatus according to an exemplary embodiment of the present invention.

Referring to FIG. 14, a controller 1410 determines whether to transmit a signal generated in a first CSI-RS transmitter 1400 and a signal generated in a second CSI-RS/interference measurement resource transmitter 1420. As described above, the first CSI-RS signal is a periodically transmitted signal and is transmitted in order to measure channels for a plurality of transmission antennas or a plurality of beams generated by a plurality of transmission antennas. In contrast, in the case of the second CSI-RS, the eNB determines, in each subframe, a time interval in which the second CSI-RS is to be transmitted, a UE to which the second CSI-RS is to be transmitted, and a frequency band in which the second CSI-RS is to be transmitted. Thereafter, the signal is transmitted while being carried by a Resource Element (RE) to be transmitted by an RE mapper 1430. Furthermore, the controller 1410 notifies control information on transmission of the second CSI-RS and the interference measurement resource to each UE by using a PDCCH or an E-PDCCH. Here, the information needed for reception of the second CSI-RS or the interference measurement resource by each UE may include a part which the UE can determine according to a predefined rule between the UE and an eNB.

Figure 15:
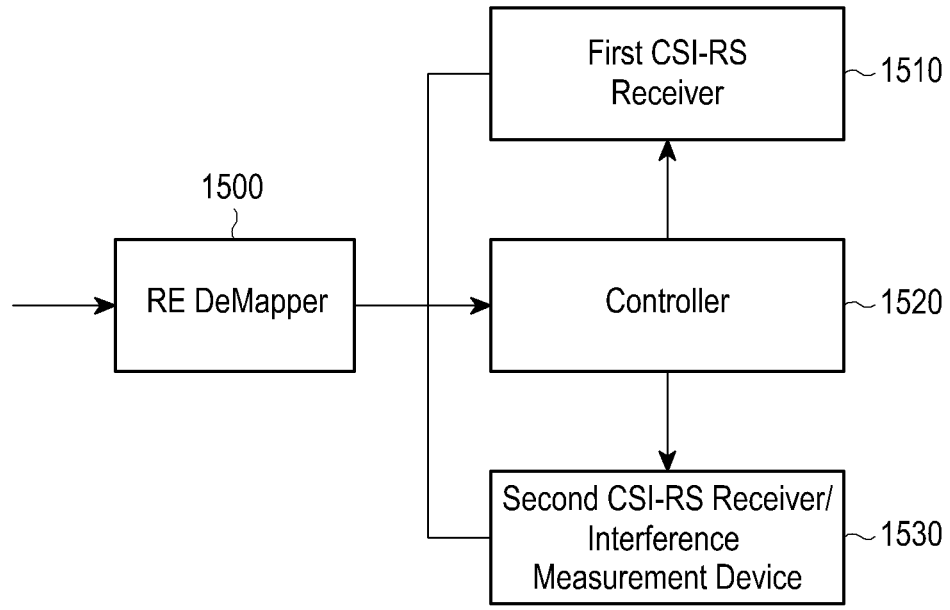
FIG. 15 illustrates a reception apparatus according to an exemplary embodiment of the present invention.

FIG. 15 illustrates a reception apparatus according to an exemplary embodiment of the present invention.

Referring to FIG. 15, received wireless signals are classified into first CSI-RSs, second CSI-RSs, and interference measurement resources by an RE demapper 1500, which are then input to a first CSI-RS receiver 1510 and a second CSI-RS/interference measurement resource receiver 1530, respectively. The first CSI-RS receiver 1510 is a receiver for receiving signals transmitted in all frequency bands, and the second CSI-RS/interference measurement resource receiver 1530 is a receiver for receiving only signals transmitted in the time intervals and frequency bands allocated by the eNB. A controller 1520 determines the time interval and the frequency band in which the second CSI-RS/interference measurement resource receiver 1530 is to receive a signal. The controller 1520 is notified of the determination by receiving a PDCCH or an E-PDCCH from the eNB or identifies the corresponding information based on a predefined rule between the eNB and the UE as described above.

According to exemplary embodiments of the present invention, it is possible to effectively transmit a reference signal in a MIMO system having scores or more transmission antennas. Furthermore, according to exemplary embodiments of the present invention, it is possible to allocate resources to a reference signal and measure an interference signal in a MIMO system having scores or more transmission antennas.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method for receiving reference signals by a terminal in a wireless communication system, the method comprising:
    receiving, from a base station, a control message configuring a plurality of channel state information (CSI) resource sets for a CSI reporting, wherein the plurality of CSI resource sets comprises a first resource set associated with a CSI reference signal (CSI-RS) resource for a channel measurement, a second resource set associated with a CSI-RS resource for an interference measurement, and a third resource set associated with a CSI interference measurement (CSI-IM) resource, and each of the first resource set, the second resource set, and the third resource set is set to periodic, aperiodic, or semi-static;
    receiving, from the base station, reference signals according to the first resource set, the second resource set, and the third resource set;
    generating a CSI for the CSI reporting based on the received reference signals; and
    transmitting, to the base station, the CSI.

2. The method of claim 1, wherein the control message further includes:
    first frequency information and first time information for identifying at least one CSI-RS resource for the first resource set,
    second frequency information and second time information for identifying at least one CSI-RS resource for the second resource set, and
    third frequency information and third time information for identifying at least one CSI-IM resource for the third resource set.

3. The method of claim 2,
    wherein the first frequency information indicates resource blocks (RBs) for the at least one CSI-RS resource for the first resource set, and
    wherein the second frequency information indicates RBs for the at least one CSI-RS resource for the second resource set.

4. The method of claim 3, wherein the control message further includes:
    first antenna port information indicating a number of antenna ports for the at least one CSI-RS resource for the first resource set, and
    second antenna port information indicating a number of antenna ports for the at least one CSI-RS resource for the second resource set.

5. The method of claim 1, further comprising:
    receiving, from the base station, downlink control information (DCI) including information on a CSI request, wherein the CSI is transmitted to the base station based on the CSI request.

6. A method for transmitting reference signals by a base station in a wireless communication system, the method comprising:

transmitting, to a terminal, a control message configuring a plurality of channel state information (CSI) resource sets for a CSI reporting, wherein the plurality of CSI resource sets comprises a first resource set associated with a CSI reference signal (CSI-RS) resource for a channel measurement, a second resource set associated with a CSI-RS resource for an interference measurement, and a third resource set associated with a CSI interference measurement (CSI-IM) resource, and each of the first resource set, the second resource set, and the third resource set is set to periodic, aperiodic, or semi-static;

transmitting, to the terminal, reference signals according to the first resource set, the second resource set, and the third resource set; and receiving, from the terminal, a CSI for the CSI reporting generated based on the transmitted reference signals.

7. The method of claim 6, wherein the control message further includes:

first frequency information and first time information for identifying at least one CSI-RS resource for the first resource set, second frequency information and second time information for identifying at least one CSI-RS resource for the second resource set, and third frequency information and third time information for identifying at least one CSI-IM resource for the third resource set.

8. The method of claim 7, wherein the first frequency information indicates resource blocks (RBs) for the at least one CSI-RS resource for the first resource set, and wherein the second frequency information indicates RBs for the at least one CSI-RS resource for the second resource set.

9. The method of claim 8, wherein the control message further includes:

first antenna port information indicating a number of antenna ports for the at least one CSI-RS resource for the first resource set, and second antenna port information indicating a number of antenna ports for the at least one CSI-RS resource for the second resource set.

10. The method of claim 6, further comprising:

transmitting, to the terminal, downlink control information (DCI) including information on a CSI request, wherein the CSI is received from the terminal based on the CSI request.

11. A terminal for receiving reference signals in a wireless communication system, the terminal comprising:

a transceiver configured to transmit and receive a signal; and a controller configured to:

receive, from a base station, a control message configuring a plurality of channel state information (CSI) resource sets for a CSI reporting, wherein the plurality of CSI resource sets comprises first resource set associated with a CSI reference signal (CSI-RS) resource for a channel measurement, a second resource set associated with a CSI-RS resource for an interference measurement, and a third resource set associated with a CSI interference measurement (CSI-IM) resource, and each of the first resource set, the second resource set, and the third resource set is set to periodic, aperiodic, or semi-static, receive, from the base station, reference signals according to the first resource set, the second resource set, and the third resource set, generate a CSI for the CSI reporting based on the received reference signals, and transmit, to the base station, the CSI.

12. The terminal of claim 11, wherein the control message further includes:

first frequency information and first time information for identifying at least one CSI-RS resource for the first resource set, second frequency information and second time information for identifying at least one CSI-RS resource for the second resource set, and third frequency information and third time information for identifying at least one CSI-IM resource for the third resource set.

13. The terminal of claim 12, wherein the first frequency information indicates resource blocks (RBs) for the at least one CSI-RS resource for the first resource set, and wherein the second frequency information indicates RBs for the at least one CSI-RS resource for the second resource set.

14. The terminal of claim 13, wherein the control message further includes:

first antenna port information indicating a number of antenna ports for the at least one CSI-RS resource for the first resource set, and second antenna port information indicating a number of antenna ports for the at least one CSI-RS resource for the second resource set.

15. The terminal of claim 11, wherein the controller is further configured to receive, from the base station, downlink control information (DCI) including information on a CSI request, and wherein the CSI is transmitted to the base station based on the CSI request.

16. A base station for transmitting reference signals in a wireless communication system, the base station comprising:

a transceiver configured to transmit and receive a signal; and a controller configured to:

transmit, to a terminal, a control message configuring a plurality of channel state information (CSI) resource sets for a CSI reporting, wherein the plurality of CSI resource sets comprises a first resource set associated with a CSI reference signal (CSI-RS) resource for a channel measurement, a second resource set associated with a CSI-RS resource for an interference measurement, and a third resource set associated with a CSI interference measurement (CSI-IM) resource, and each of the first resource set, the second resource set, and the third resource set is set to periodic, aperiodic, or semi-static, transmit, to the terminal, reference signals according to the first resource set, the second resource set, and the third resource set, and receive, from the terminal, a CSI for the CSI reporting generated based on the transmitted reference signals.

17. The base station of claim 16, wherein the control message further includes:

first frequency information and first time information for identifying at least one CSI-RS resource for the first resource set, second frequency information and second time information for identifying at least one CSI-RS resource for the second resource set, and third frequency information and third time information for identifying at least one CSI-IM resource for the third resource set.

18. The base station of claim 17, wherein the first frequency information indicates resource blocks (RBs) for the at least one CSI-RS resource for the first resource set, and wherein the second frequency information indicates RBs for the at least one CSI-RS resource for the second resource set.

19. The base station of claim 18, wherein the control message further includes:

first antenna port information indicating a number of antenna ports for the at least one CSI-RS resource for the first resource set, and second antenna port information indicating a number of antenna ports for the at least one CSI-RS resource for the second resource set.

20. The base station of claim 16, wherein the controller is further configured to transmit, to the terminal, downlink control information (DCI) including information on a CSI request, and wherein the CSI is received from the terminal based on the CSI request.

* * * * *